INVENTORS:
Jack M. Reid
and Paul L. Michael,
BY
Bair, Freeman & Molinare
ATTORNEYS.

United States Patent Office 3,264,864
Patented August 9, 1966

3,264,864
APPARATUS FOR PINPOINTING LEAKS
IN BURIED PIPES
Jack M. Reid, Villa Park, Ill., and Paul L. Michael, State College, Pa., assignors, by mesne assignments, to American Gas Association, New York, N.Y., a corporation of New York
Filed Mar. 1, 1962, Ser. No. 176,721
14 Claims. (Cl. 73—69)

This invention relates in general to means and methods for detecting gas leaks in buried pipe and more particularly to improved arrangements for either transmitting and detecting a signal passed through a pipe leak or detecting the signal generated by the gas as it escapes through the leak.

An important problem in the gas industry is the need for detecting the location of a leak in a buried gas pipe or conduit without the necessity of uncovering the pipe to ascertain the leak position. A number of systems have been proposed for overcoming this problem, one of the most important of which is disclosed in application Serial No. 853,798, filed November 18, 1959, now Patent No. 3,055,209, issued September 25, 1962, of which this application is a continuation-in-part. That important system incorporated a basic improvement in that it included an arrangement for generating a sonic signal in the pipe at one location and scanning the earth's surface with a transducer in the proximity of the leak to locate the point of maximum signal reception. This point corresponds to the position of the leak and enables that position to be ascertained without the need for first laying bare or excavating the pipe. The system therefore requires means for transmitting a signal, and a signal detecting arrangement responsive thereto located at a receiving station and movable to various positions.

Such a detecting arrangement may be a microphone or any other type of transducer sensitive to the frequency of the transmitted signal. It has been found that transducers of conventional design, even if sensitive to the frequency of the transmitted signal, do not in most instances accurately or reproducibly indicate the intensity of the transmitted wave at the earth's surface.

It is, therefore, one object of the present invention to provide an improved signal detecting transducer for use in locating the position of a leak in a buried conduit or pipe.

In addition, a signal of the same frequency as the transmitted signal but continuously changing in phase is coupled with the input of the transducer for producing a characteristic output signal. The characteristic of the output signal serves to identify the nature of the signal since random signals of the same frequency that may be superimposed thereon will change the characteristic. It is therefore only necessary to scan the earth with the transducer until the characteristic signal reaches maximum amplitude in order to identify the location of the leak.

It is another object of the present invention to provide an improved arrangement for discriminating between the signals transmitted through the leak and ambient signals of the same frequency resulting from extraneous noise sources.

It has also been found that transmitters of conventional design, in addition to causing the desirable sonic wave to transmit inside of the pipe, cause an undesirable mechanical excitation of the pipe wall. This mechanical excitation, being of the same frequency as the desirable sonic wave, can, of course, be received by the detection apparatus. Its presence will be detected at any point above the pipe without respect to gas leakage from the pipe and hence will cause an interference with the desired results.

It is, therefore, still another object of the present invention to provide an improvement in the transmitting arrangement so as to reduce the undesirable mechanical excitation of the pipe wall in the course of transmitting the desired sonic wave inside of the pipe.

The gas in passing through the leak also generates certain natural sounds which are efficiently detected by a transducer utilizing the principles of the present invention. By coupling a pair of such transducers in a predetermined special arrangement, the need for generating and transmitting a sonic signal in the gas may be avoided. Thus similar signals will be detected at each transducer, differing, however, in phase relationship dependent on the spacing between. The difference in phase relationship is used to provide the characteristic signal output described above that serves to identify the signal generated by the gas escaping the leak from random noise and by moving the paired transducers into a position where the maximum amplitude of the characteristic signal is provided, the leak is located.

It is yet another object of the invention to provide an improved arrangement for detecting the location of a leak in a buried pipe without the need for generating and transmitting a specific signal in the pipe.

These and other objects, advantages, and functions of the invention will be apparent upon reference to the specification and to the accompanying drawings, in which like parts are identified by like reference symbols in each of the views, and in which.

Figure 1:
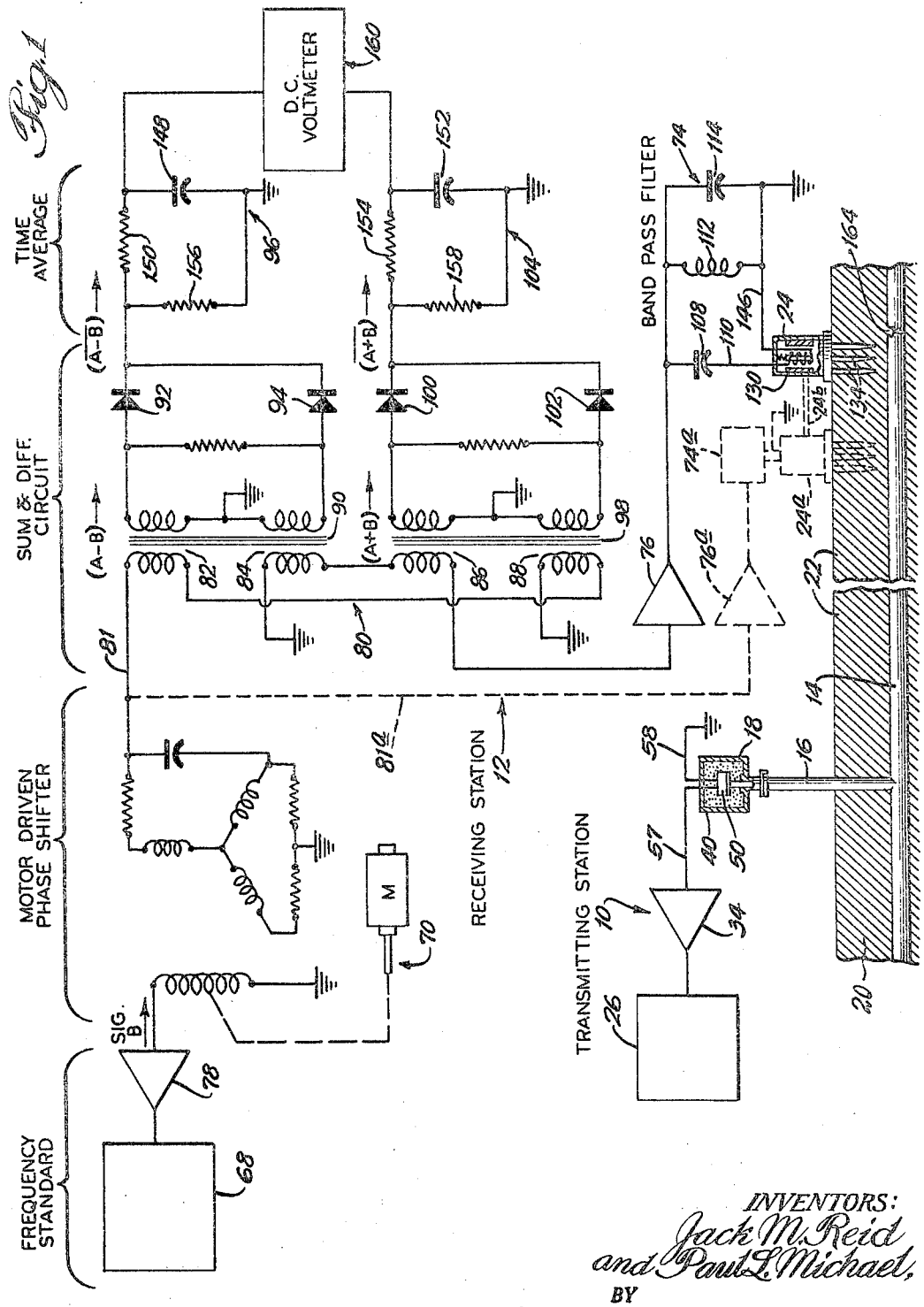
FIGURE 1 illustrates the principles of the present invention in a system for locating the position of a gas leak.

In FIGURE 1 a gas leak detection system comprising a signal transmitting station 10 and a signal receiving station 12 are illustrated. The transmitting station 10 introduces signals of sonic frequency into a main gas conduit or pipe 14 through a branch pipe 16 by means of a sonic wave transmitter 18. The signals are transmitted through the gas in the pipe 14, which is buried in the earth 20 at some distance below the surface 22. The pipe 14 in a typical case can be located approximately 3 ft. below surface 22 and transmits gas at a pressure of 5 lbs. per sq. in. for example. The transmitted signals are detected at a portable transducer 24 located at the receiving station 12 and which is adapted to be coupled to the earth's surface at different positions.

The transmitting station 10 comprises an A.C. electrical signal generator indicated by the block marked 26 connected to an amplifier 34, the output of which is connected to a sonic wave projector 18. The projector 18 feeds the signals into the branch pipe 16 so that they may be transmitted through the gas pipe 14 for tracing the leak.

Figure 3:
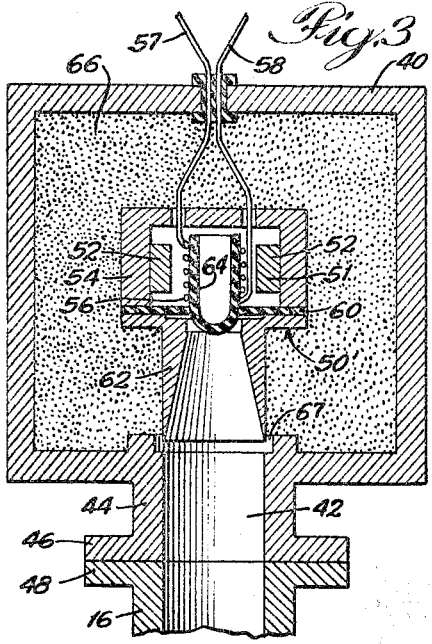
FIGURE 3 illustrates the sonic wave transmission appartus.

The sonic wave projector or transmitter 18 shown in detail in FIGURE 3 comprises an enclosure or housing 40 having a passageway 42 defined by a projecting ring 44 on the housing. This ring terminates in a flange 46 adapted to be coupled in a gas-tight relationship with a similar flange 48 on the branch pipe 16.

The housing 40 contains suitable apparatus 50 for converting an electrical signal into a sonic signal to be transmitted through the gas in pipe 16. This apparatus includes a magnet 51 having a pair of opposing poles 52 supported in a cage member 54. A coil 56 is located between the poles 52, and its end terminals connect to amplifier 34 and to ground respectively over lead 57 and a lead 58 which extend through the housing 40.

A diaphragm 60 is clamped along its periphery between the member 54 and another member 62 having a passageway communicating with the passageway 42. The diaphragm 60 has a central extension 64 upon which the coil 56 is wound so that variations in the field of the coil serve to move the diaphragm. This generates sonic waves in the gas in passageway 42 of a frequency corresponding to the input signal applied to the coil. These sonic waves are in turn transmitted through the pipes 16 and 14.

The members 54 and 62 are surrounded and supported in the housing 40 by a damping body 66 of foam plastic, for example. The member 62 is spaced apart from housing 40 at a juncture 67 of its passageway and passageway 42 so as to prevent direct mechanical coupling between apparatus 50 and pipes 16 and 14. With this arrangement, the output of the amplifier 34 is reproduced as a sonic wave of the desired frequency in the gas only since the diaphragm 60 is effectively isolated from the housing 40 and pipes 14 and 16.

The receiving station 12 comprises a frequency standard 68 and a phase shifting network 70 to produce a reference signal, the transducer 24, a narrow band pass filter 74, and an amplifier 76 to receive, select, and amplify the transmitted signal from the earth's surface, and circuits to indicate the degree of correlation between the transmitted and reference signals. Reference frequency standard 68 is similar to the transmitter standard 26 and generates a sinusoidal signal of the same frequency characteristics as the transmitted waves. Frequency standard 68 is connected to an amplifier 78 which in turn is connected to a 360° phase shifting network 70. The phase shift is rendered continually variable by the motor M through 360°. The rate of change in phase must be selected so that any difference occurring normally between the signals generated by standards 26 and 68 is insignificant with respect to the rate of phase change. Usually a rate of change of about 25 degrees per second is recommended. The output of the phase shifter 70 is applied to a sum and difference circuit 80 over a lead 81.

The sum and difference circuit 80 includes the transformers 82, 84, 86 and 88. The transformers 82 and 84 are wound on a common core 90 in voltage-subtracting relationship. One terminal of the secondaries of transformers 82 and 84 is connected to ground and the other terminal of each secondary is connected through a respective unidirectional circuit element 92 and 94 to a time-averaging circuit 96.

The transformers 86 and 88 are wound on a common core 98 in voltage-adding relationship and one terminal of their secondaries is connected to ground while the other terminal of each is connected through a respective unidirectional circuit element 100 and 102 to a time-averaging circuit 104.

The primaries of transformers 82 and 88 are connected in series to the output of the phase shifter 70 over lead 81. The primaries of transformers 84 and 86 are connected in series to the output of the signal detecting amplifier 76.

The input for amplifier 76 is derived through the filter circuit 74 having a narrow band pass characteristic, preferably no more than plus or minus 1%. The filter circuit comprises a capacitor 108 connected in series over a lead 110 to the transducer 24. A bypass circuit including a coil 112 and capacitor 114 is provided to bypass undesired frequencies. The details of the transducer 24 are illustrated in FIGURES 4 and 5.

Figure 6:
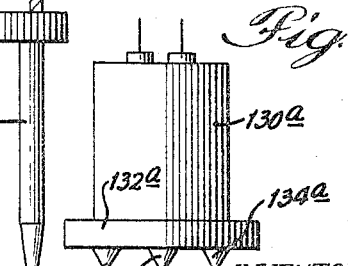
FIGURE 6 is a side elevational view illustrating a slight modification of the transducer shown in FIGURES 4 and 5.

The transducer 24 comprises a housing 130 having a base 132. Protruding from the base are a cluster of three rigidly mounted parallel prongs or spikes 134 for use in penetrating unfrozen ordinary soil which is not very stiff or hard. Their length and diameter are not critical, but preferably should be of equal length and penetrate the earth to at least 2" to bring the base 132 into contact with the earth's surface. Very long prongs or spikes are not desirable due to the difficulty of securing the required depth of insertion. A 5" length with prongs of ⅜" diameter has been found most satisfactory. The number of prongs should be between 3 and 6 since a larger number makes insertion difficult while 1 or 2 spikes do not give satisfactory performance. This is believed to be due to the failure to achieve a positive contact between the earth and base 132 with sufficient force in all directions. A single prong provides little contact force between the earth and base other than that resulting from the weight of the transducer. It also has been determined that three prongs arranged in a line are no more desirable than two. Preferably, therefore, the prongs are grouped or placed circularly.

Where the earth's surface is hard or stiff, such as characterized by road paving or frozen soil, a transducer such as indicated in FIGURE 6 is utilized. This transducer comprises a housing 130a and a base 132a having prongs 134a. It has similar characteristics to the transducer 24 but the prongs 134a are simply pointed projections arranged as a tripod so that the transducer 130 will be supported in an upright position with the three points in contact with the earth. Less than three projections will not maintain the transducer in the desired position, while a greater number will not assure equal weight distribution at all points of contact. The coupling of the transducer to the earth's surface is complicated by what appears to be a transducer-earth surface resonance. The mass of the transducer and the stiffness of the earth's surface are factors that influence the frequency at which maximum response occurs. Under practical conditions (concrete, asphalt, frozen soil surfaces) we have found that the weight of the transducer 130a, 132a, 134a should range between 0.2 and 5 pounds.

Figure 4:
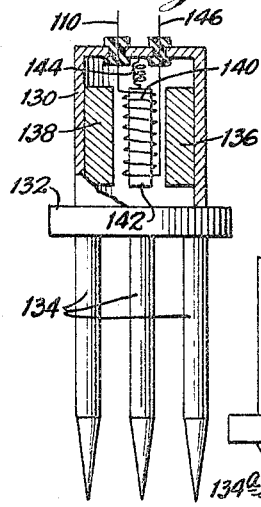
FIGURE 4 is a schematic side elevational view illustrating in partial cross-section the transducer utilized for detecting the transmitted signal.
Figure 5:
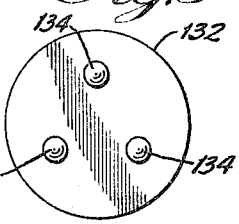
FIGURE 5 is a bottom elevational view of the transducer illustrated in FIGURE 4.

Transducers of the type illustrated in FIGURE 4 include a permanent magnet whose opposite poles 136 and 138 are shown supported along the vertical wall of housing 130. A coil 140 wound upon a core 142 is suspended between the poles from the top wall of the housing by means of a spring 144. One terminal of the coil 140 is connected to the capacitor 108 over lead 110 and the other terminal is connected to ground over a lead 146 with the leads extending through the top wall of housing 130. This assembly is sensitive to mechanical vibrations at sonic frequencies but is relatively insensitive to sonic pressure waves as might appear in the air from ambient noise sources. The transducer 24 feeds the filter circuit 74 with electrical signals of a frequency corresponding to the received signals. It will be appreciated that other sensitive assemblies, employing piezoelectric crystals for example, may also be employed.

The time averaging circuit 96 comprises a capacitor 148 connected to the unidirectional circuit elements 92 and 94, through a resistor 150. The time averaging circuit 104 comprises a capacitor 152 connected to elements 100 and 102 through a resistor 154. Resistors 156 and 158 are connected across the capacitors 148 and 152 respectively, and the time constants of the time averaging circuits are chosen in accordance with the practicalities of the situation and are usually between 1 and 20 seconds.

An output circuit 160 comprising a recording D.C. volt meter is connected between the capacitors 148 and 152 and the position of its needle will vary in accordance with the amplitude of the voltage difference between the charges on the two capacitors.

Figure 2:
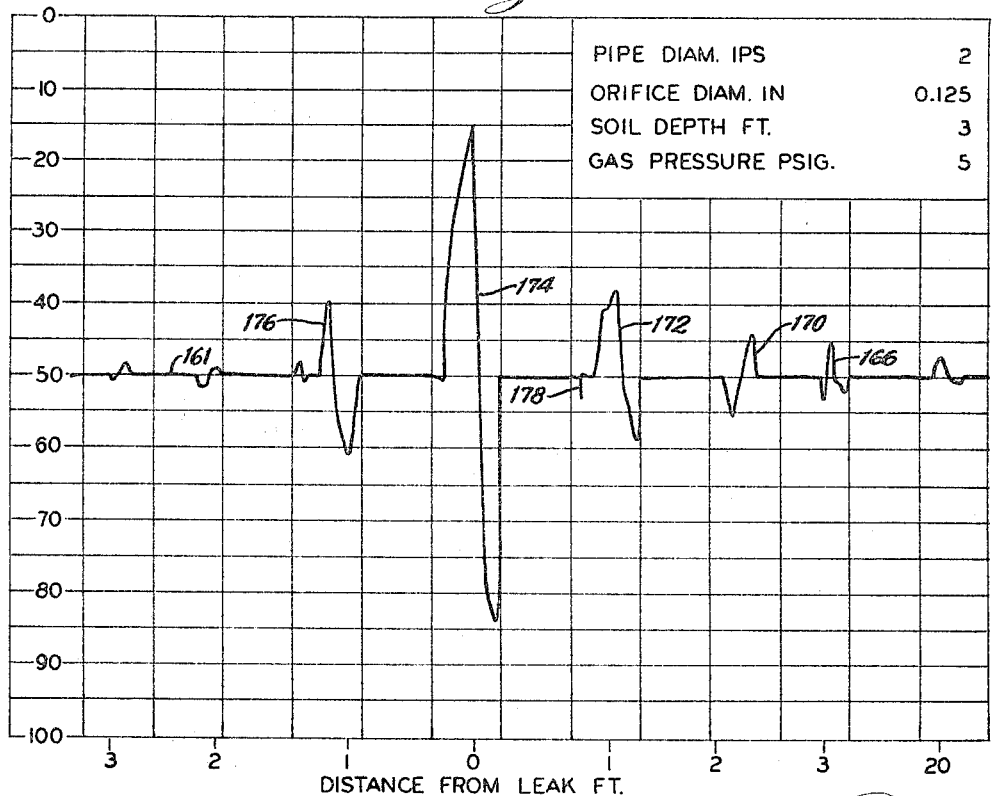
FIGURE 2 illustrates typical wave form secured during operation of the system.

With the frequency standard 68 providing a sine wave output, this output will appear across the secondaries of transformers 82 and 88 to charge capacitors 148 and 152 in the same direction. Since the charge on each capacitor results from the same portion of the wave appearing on lead 81, the voltage difference between the charges on the capacitors will be zero. The needle of the volt meter will remain undeflected, as illustrated by the straight portions of line 161 in FIGURE 2 adjacent the center of the scale.

With the system in operation, the sonic projector 18 mounted on the branch pipe 16 is transmitting a sonic tarcer wave through the gas in pipe 14 at a frequency comparable to the frequency provided by standard 26 with minimum effect on the pipe walls. Assuming the presence of a leak in the pipe, as indicated at 164 in FIGURE 1, a wave will be transmitted through the leak. The sonic pressure wave in the gas will therefore result in the transmission of a mechanically excited sonic wave in the earth for detection by the transducer 24.

An operator at station 12 attempting to locate the gas pipe leak at 164 will position the transducer 24 adjacent where he believes the leak to be. If no signal is received or if its level is so low as to be indistinguishable from background noise, the D.C. volt meter at output circuit 160 will simply show a zero reading.

If the transducer 24 receives a signal from the transmitting station 10, this signal will be of the same frequency generated by the frequency standard 68 and of an amplitude proportional to the distance of the transducer 24 from the leak. The output of the transducer 24 is of course filtered to remove signals of all other frequencies except that of the transmitted signal.

Since the phase of the signal applied from the phase shifter 70 over lead 81 to the sum and difference circuit 80 is continuously varied and of a known amplitude, the resultant output of the sum and difference circuit when a signal from station 10 is applied thereto, will vary in a characteristic manner or frequency and at an amplitude corresponding to the amplitude of the signal from station 10. The needle of the D.C. volt meter will therefore move in a manner characteristic of the output of the sum and difference circuit as shown by wave forms 166–167 in FIGURE 2. The peak amplitude of the needle movement will of course be dependent on the amplitude of the signal received from station 10 and therefore the distance of transducer 24 from the leak 164. The operator may simply shift the transducer from point to point to derive characteristic signals such as 166 and 172 until he has secured a characteristic signal of maximum amplitude as shown at 174 in FIGURE 2. This will indicate the position on the earth's surface closest to the leak.

If a random noise signal in the acceptable frequency range does appear, it will of course be detected at the transducer 24 and be applied through the amplifier 76 to the sum and difference circuit 80. The random noise signal will be applied, therefore, to the time averaging circuits 96 and 104, but since it has a random and nonperiodic relationship to the signal provided over lead 81, it will appear as a zero output to the volt meter if its time period is short or as a peak varying from the normal characteristic as shown at 178 in FIGURE 2. The operator therefore immediately knows it is a noise signal and is not derived from the leak.

It will be appreciated, of course, that a number of stations such as 12 may be used to accomplish the same result and thereby avoid extensive movement of any one transducer 24.

It will be also appreciated that other means for accomplishing the desired results are possible. For example, both the signal projected into the pipe and the reference signal may be generated by a single frequency standard and the need for the second frequency standard 68 can be eliminated by connecting a suitable radio transmitter to the output of the first frequency standard 26 and transmitting the electrical A.C. signal generated by standard 26, and receiving the radio transmitted signal at portable receiving station 12 with a suitable radio receiver, the output of which is connected to the input of amplifier 78. By this arrangement the practical problem of maintaining closely matched outputs from two independent frequency standards is avoided.

In another variation, the constant rate of phase change between the transmitted signal and the reference signal can be accomplished without the motor driven phase shifter 70 by adjusting the frequency of the signal generated by frequency standard 26 and the frequency of the signal generated by frequency standard 68 to different values so that the natural change in phase thus produced between them corresponds to the desired rate of phase change.

Referring again to FIG. 1, the operation of the leak detection arrangement in which the need for artificially generating the signals to be compared at the receiving station 12 is avoided will now be explained. In this case detection of the leak depends on the signal created by the gas itself as it escapes through the leak. The apparatus at the transmitting station 10 is therefore omitted together with the frequency standard 68 and the phase shifter 70 at the receiving station 12.

The lead 81, instead of being connected to the output of the phase shifter 70, is connected to an amplifier 76a over a lead 81a as indicated by the correspondingly marked broken lines. The amplifier 76a is used in conjunction with amplifier 76 to feed the detected signal to the sum and difference circuit. The input to the amplifiers 76 and 76a is derived from band pass filters 74 and 74a. In this particular form of the invention the filter 74 is modified so that the pass band is sufficiently broad to receive those frequencies generated by the leak, which may range between 500 and 2000 cycles per second (2 octaves). The filter may be designed to receive a narrow band of frequencies within this broad range, preferably not less than ⅓ octave. The filter 74a is identical in construction. The input to filters 74, 74a is derived from transducers 24 and 24a.

The transducer 24a is spatially or geometrically situated with respect to transducer 24 in a predetermined manner as indicated by the broken lines 24b. The connection is only indicated schematically by the lines 24b, it being understood that any number of well known arrangements may be used to locate the transducers 24 and 24a in a predetermined spatial relationship. With the transducers having a predetermined spatial relationship, the signal detected by each will be of the same frequency as that generated by the gas passing through the leak, but will vary in phase by an amount depending on the spacing between the transducers and the lateral distance from the transducers to a point on the earths surface directly above the leak.

The output of the transducers on being extended through the respective amplifiers 76 and 76a and applied to the sum and difference circuit 80 and the time averaging circuits 96 and 104 will therefore result in a characteristic signal. The amplitude of the characteristic signal will vary in accordance with the distance of the transducers from the leak in a manner similar to that shown in FIG. 2 so that the maximum signal will occur when they are located above the leak. Random noise signals of the same frequency on the other hand will result in a deviation from the characteristic signal, as described, and will therefore be disregarded.

While there has been shown and described particular embodiments of this invention, it will be obvious to those skilled in the art that various other changes and modifications may be made therein without departing from the invention and, therefore, it is intended in the ap-

What we claim as new, and desire to secure by Letters Patent of the United States, is:

1. An apparatus for use in locating a leak in a buried gas conveying conduit without excavating said conduit in which gas conveyed by said conduit is employed to transmit a wave of one sonic frequency through said leak, the improvement comprising transducer means at the earth's surface for detecting said wave and generating a first electrical signal corresponding to said one frequency with the voltage of said first electrical signal being proportional to the distance of said transducer means from said leak, a second means for generating a second electrical signal of said one frequency with a continuously varying phase to be used as a reference signal, and means for comparing said first signal from said transducer with said second signal having said continuously varying phase whereby a characteristic signal is derived having a maximum voltage proportional to the distance between said transducer means and said leak, the character of said derived signal varying in a predetermined manner whereby said transducer first signal may be distinguished from transducer signals caused by background noises of other frequencies and from random noise signals of said one frequency.

2. The apparatus of claim 1 in which said comparing means comprises a sum and difference circuit adapted to provide an output comprising both the sum and difference between said first and second signals, a time averaging circuit for the output sum, a time averaging circuit for the output difference, and means for detecting the voltage difference between said output sum and said output difference.

3. The apparatus of claim 1 in which said transducer means comprises a housing, a base, and a plurality of prongs for supporting said base adjacent the surface of the earth.

4. Apparatus for use in locating a leak in a gas-conveying conduit positioned beneath the earth's surface, comprising means for generating a wave of one sonic frequency in said gas only whereby a mechanical wave of corresponding frequency is passed through the earth above said leak, means for generating a first electrical signal of said one frequency at a continuously varying phase, portable transducer means for detecting said mechanical wave and generating a second electrical signal corresponding to the one frequency with the voltage of said second signal being proportional to the distance of said transducer means from said leak, and means for comparing said first signal with said second signal whereby a characteristic signal is derived having a maximum voltage proportional to the distance of said transducer means from said leak, the character of said derived signal varying in a predetermined manner whereby said first signal may be distinguished from random noise signals of said one frequency.

5. The apparatus of claim 4 in which said portable transducer comprises suspended electrical signal generating means, a housing having a base at one end and completely enclosing said suspended electrical signal generating means, and a plurality of spikes arranged circularly and projecting from said base.

6. Apparatus for locating a leak in a buried conduit having gas passed therethrough, comprising a transmitting station for generating a wave of one sonic frequency and imparting the same to the gas in said buried conduit, a receiving station, a portable transducer at said receiving station and adapted to be placed at successive points on the surface of the earth, said transducer being sensitive to a mechanical wave of sonic frequency transmitted by the gas in said buried conduit through said leak and adapted to convert said waves into a first A.C. electrical signal of equivalent frequency whose voltage is proportional to the intensity of the mechanical wave at the surface of the earth, means at said receiving station for generating a second A.C. electrical signal of said sonic frequency, means at said receiving station for varying the phase angle of said second signal, first means at said receiving station for combining said first and second signals so as to produce a first output proportional to the instantaneous sum of the first and second signals, second means at said receiving station for combining said first and second signals so as to produce a second output proportional to the instantaneous difference between the first and second signals, and means at said receiving station for detecting and indicating the difference between said first and second outputs.

7. In the apparatus of claim 6 filtering means connected between said transducer and said first and second combining means at said receiving station for rejecting all frequencies other than said signal frequency.

8. The apparatus of claim 6 in which said transducer comprises an element for detecting mechanical waves generated in the earth by the sonic wave in the gas passing through said leak, and means for insulating said element from air borne waves.

9. The apparatus of claim 8 in which said transducer has means for coupling said element to the earth along a plurality of intersecting planes.

10. The apparatus of claim 6 in which said phase angle is varied at a rate greater than a possible frequency difference between said first and second signals.

11. The apparatus of claim 6 in which said detecting means comprises a time averaging circuit having a time constant longer than that of normal randomly generated noise signals.

12. An apparatus for locating a leak in a buried conduit having gas passed therethrough, comprising a transmitting station for generating a wave of one sonic frequency, means at said transmitting station for transmitting said wave in said gas in said buried conduit, a receiving station, a portable transducer at said receiving station and adapted to be placed at successive points on the surface of the earth, said transducer being sensitive to a mechanical wave of a sonic frequency transmitted by the gas in said buried conduit through said leak and adapted to convert said mechanical wave into a first A.C. electrical signal of equivalent frequency whose voltage is proportional to the intensity of the transsmitted wave at the surface of the earth, filtering means at said receiving station for separating electrical signals of other frequencies from said first signal, means at said receiving station for amplifying said first signal, means at said receiving station for generating a second A.C. electrical signal of the same frequency as the first signal, means at said receiving station for varying the phase angle of said second signal at a rate substantially greater than the possible frequency difference between said first and second signal, first means at said receiving station for combining the first signal with the second signal so as to produce a single electrical wave proportional to the instantaneous sum of the first and second signal, second means at said receiving station for combining the first and second signal so as to produce a single electrical wave proportional to the instantaneous difference between the first and second signals, means at said receiving station for rectifying and time averaging the sum wave and the difference wave, and means at said receiving station for detecting and indicating the difference in voltage between the averaged sum wave and the averaged difference wave.

13. A sonic wave transmitter for use in transmitting an electrical wave of sonic frequency generated at one position as a pressure wave of said frequency in a gas being passed through a buried conduit having a wall for confining said gas, the improvement comprising a diaphragm in contact with said gas, means for moving said diaphragm at a frequency corresponding to the frequency of an electrical signal received by said means whereby a pressure wave of corresponding frequency is generated in said gas, and means for isolating said diaphragm and said moving means from the wall of said conduit to prevent the generation of a mechanical vibration of said frequency in said wall by said diaphragm, said last named means comprising a damping body of foam plastic substantially surrounding and supporting said diaphragm and said moving means to prevent direct mechanical coupling with said conduit.

14. A sonic wave transmitter for use in transmitting an electrical wave of sonic frequency generated at one position as a pressure wave of said frequency in a gas being passed through a conduit, comprising a diaphragm having one side in contact with said gas, means for clamping the periphery of said diaphragm, means supported by said clamping means for operating said diaphragm at a frequency corresponding to said electrical wave to generate a pressure wave of corresponding frequency in said gas, means for supporting all of said means and said diaphragm on said conduit, and damping means located between said supporting means and said clamping means for isolating said diaphragm from said conduit.

References Cited by the Examiner

UNITED STATES PATENTS

| | | | |
|---|---|---|---|
| 714,775 | 12/1902 | Brown | 73—69 |
| 1,087,772 | 2/1914 | Johnson | 73—71 |
| 2,008,934 | 7/1935 | Smith | 73—40.5 |
| 2,274,262 | 2/1942 | Wolff | 73—194 |
| 2,365,218 | 12/1944 | Rogers | 73—71.4 |
| 2,515,221 | 7/1950 | Henning | 73—194 X |
| 2,518,327 | 8/1950 | Jahn | 73—40.5 |
| 2,600,967 | 6/1952 | Chernosky | 73—71.2 X |
| 2,937,520 | 5/1960 | Bell | 73—40.5 |
| 2,940,302 | 6/1960 | Scherbatskoy | 73—40.5 |
| 2,951,366 | 9/1960 | Mark et al. | 73—69 |
| 3,028,450 | 4/1962 | Manning | 73—40.5 |

FOREIGN PATENTS

| | | |
|---|---|---|
| 508,751 | 1/1955 | Canada. |
| 1,085,959 | 8/1954 | France. |

RICHARD C. QUEISSER, *Primary Examiner.*

ROBERT L. EVANS, *Examiner.*

J. G. MURRAY, CHARLES A. RUEHL,
*Assistant Examiners.*